United States Patent [19]
Yasutake

[11] Patent Number: 5,805,137
[45] Date of Patent: Sep. 8, 1998

[54] TOUCH SENSITIVE INPUT CONTROL DEVICE

[75] Inventor: Taizo Yasutake, Sunnyvale, Calif.

[73] Assignee: ITU Research, Inc., Cupertino, Calif.

[21] Appl. No.: 238,428

[22] Filed: May 5, 1994

Related U.S. Application Data

[62] Division of Ser. No. 798,572, Nov. 26, 1991, Pat. No. 5,335,557.

[51] Int. Cl.$^6$ .................................................. G09G 5/08
[52] U.S. Cl. ......................... 345/156; 345/157; 345/173; 73/862.43; 341/34
[58] Field of Search .................................. 345/173, 174, 345/175, 176, 177, 178, 156, 157, 145, 163, 161, 164, 167; 178/18, 19; 73/862.043, 862.05; 341/34, 21, 22, 20; 273/438, 148 B; 364/709.11, 709.12; 74/471 XY; 463/37, 38

[56] References Cited

U.S. PATENT DOCUMENTS

| | | | |
|---|---|---|---|
| 3,490,059 | 1/1970 | Paulsen et al. | 73/862.043 |
| 4,017,858 | 4/1977 | Kuipers | 343/100 R |
| 4,216,467 | 8/1980 | Colston | 341/20 |
| 4,448,083 | 5/1984 | Hayashi | 73/862.042 |
| 4,550,221 | 10/1985 | Mabusth | 178/18 |
| 4,550,617 | 11/1985 | Fraignier et al. | 73/862.042 |
| 4,601,206 | 7/1986 | Watson | 73/510 X |
| 4,704,909 | 11/1987 | Grahn et al. | 73/862.043 |
| 4,720,805 | 1/1988 | Vye | 364/525 |
| 4,763,100 | 8/1988 | Wood | 74/471 XY |
| 4,787,051 | 11/1988 | Olson | 364/518 |
| 4,798,919 | 1/1989 | Miessler et al. | 178/18 |
| 4,811,608 | 3/1989 | Hilton | 73/862.04 |
| 4,823,634 | 4/1989 | Culver | 74/471 XY |
| 4,839,838 | 6/1989 | LaBiche et al. | 364/709.11 |
| 4,983,786 | 1/1991 | Stevens et al. | 345/157 |
| 4,988,981 | 1/1991 | Zimmerman et al. | 340/709 |
| 5,095,303 | 3/1992 | Clark | 345/164 |
| 5,128,671 | 7/1992 | Thomas, Jr. | 341/20 |
| 5,165,897 | 11/1992 | Johnson | 434/113 |
| 5,178,012 | 1/1993 | Culp | 73/510 |
| 5,185,561 | 2/1993 | Good et al. | 318/432 |
| 5,262,777 | 11/1993 | Low et al. | 345/157 X |
| 5,354,162 | 10/1994 | Burdea et al. | 414/5 |
| 5,389,865 | 2/1995 | Jacobus et al. | 318/568.11 |
| 5,408,407 | 4/1995 | Lefkowitz et al. | 364/167.01 |
| 5,429,140 | 7/1995 | Burdea et al. | 128/774 |
| 5,440,476 | 8/1995 | Lefkowitz et al. | 364/167.01 |
| 5,459,382 | 10/1995 | Jacobus et al. | 318/568.11 |
| 5,543,590 | 8/1996 | Gillespie et al. | 178/18 |
| 5,555,894 | 9/1996 | Doyama et al. | 345/161 |
| 5,565,891 | 10/1996 | Armstrong | 345/167 |

FOREIGN PATENT DOCUMENTS

| | | | |
|---|---|---|---|
| 2254911 | 10/1992 | United Kingdom . | |
| WO 92/08208 | 5/1992 | WIPO | 345/164 |
| WO 93/11526 | 6/1993 | WIPO | 345/163 |
| 95/20787 | 8/1995 | WIPO . | |
| 95/20788 | 8/1995 | WIPO . | |

OTHER PUBLICATIONS

Murakami, Tamotsu et al., "Direct and Intuitive Input Device for 3–D Shape Deformation," ACM 1994, pp. 465–470.
Kameyama, Ken–ichi et al., "A Shape Modeling System with a Volume Scanning Display and Multisensory Input Device," Presence, vol. 2, No. 2, pp. 104–111, Spring 1993.
"Artificial Reality", Myron W. Krueger (1983) pp. 55–68.

Primary Examiner—Lun-Yi Lao
Attorney, Agent, or Firm—Hickman & Martine, LLP

[57] ABSTRACT

A family of controllers incorporate multiple force/touch sensitive input elements to provide intuitive input in up to six degrees of freedom, including position and rotation, in either a Cartesian, cylindrical or spherical coordinate system. Six dimensions of input can be generated without requiring movement of the controller, which provides a controller suitable for controlling cursors and display objects in an interactive computer system and for equipment such as heavy cranes and fork lift trucks. Positional information is obtained either by use of a "pushing" or "dragging" metaphor. Rotational information is provided by either a "pushing," "twisting," or "gesture" metaphor. In certain embodiments, the same sensor is used for both positional and rotational inputs, and the two are differentiated by the magnitude of the force applied to the sensor.

7 Claims, 11 Drawing Sheets

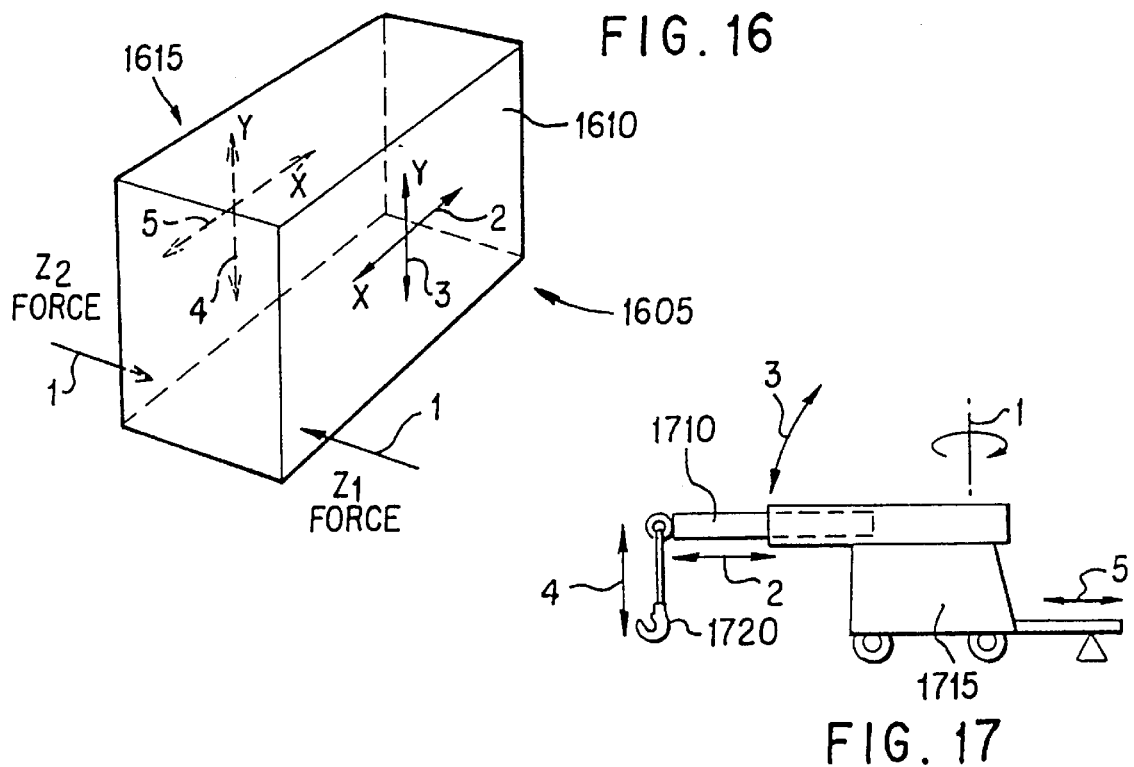
FIG. 16
FIG. 17
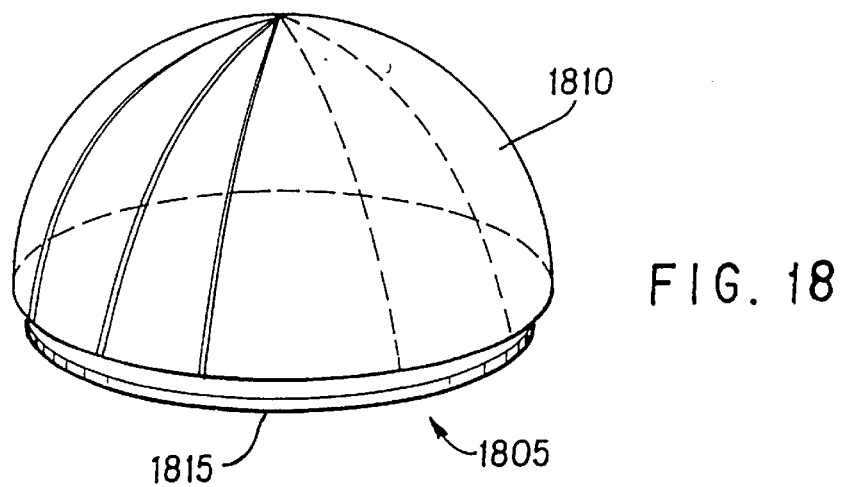
FIG. 18

TOUCH SENSITIVE INPUT CONTROL DEVICE

This application is a division of application Ser. No. 07/798,572, filed Nov. 26, 1991, now U.S. Pat. No. 5,335,557.

BACKGROUND OF THE INVENTION

1. Field

The present invention relates to the field of input control devices. More specifically, it relates to force-sensitive input-control devices with multiple surfaces capable of providing intuitive input in up to six degrees of freedom, including position and rotation relative to three axes. Six dimensions of input can be generated without requiring movement of the controller, which provides a controller suitable for controlling both cursors or display objects in an interactive computer system. Further, the controller in insensitive to acoustic or electromagnetic noise and is thus suitable for controlling equipment such as heavy cranes and fork lift trucks.

2. Art Background
2. (a) Prior Art 3D and 6D Input Control Devices.

Two-dimensional input control devices such as mice, joysticks, trackballs, light pens and tablets are commonly used for interactive computer graphics. These devices are refined, accurate and easy to use. Three-dimensional ("3D") devices allow for the positioning of cursors or objects relative to conventional X, Y and Z coordinates. Six-dimensional ("6D") devices are capable of also orienting or rotating objects. More specifically, 6D devices may provide position information as in a 3D device and further provide rotational control about each of three axes, commonly referred to as roll, pitch and yaw. However, current 3D and 6D input devices do not exhibit the refinement, accuracy or ease of use characteristic of existing 2D input devices. In fact, existing 3D/6D input devices are typically cumbersome, inaccurate, non-intuitive, tiring to use, and limited in their ability to manipulate objects.

One well known category of 3D computer controllers are the "computer gloves," such as the Power Glove controller distributed by Mattel, Inc. Similar devices include the Exos Dextrous Hand Master by Exos, Inc., and the Data Glove by VPL Research, Inc. These controllers are worn as a glove and variously include sensors for determining the position and orientation of the glove and the bend of the various fingers. Position and orientation information is provided by ranging information between multiple electromagnetic or acoustic transducers on a base unit and corresponding sensors on the glove. However, the user is required to wear a bulky and awkward glove and movement of these awkward controllers in free space is tiring. Further, these devices are typically affected by electromagnetic or acoustic interference, and they are limited in their ability to manipulate objects because of the inherent A second category of 3D/6D controllers are referred to as "Flying Mice." The Bird controller by Ascension Technology Corp. of Burlington, Vt. tracks position and orientation in six-dimensions using pulsed (DC) magnetic fields. However, it is affected by the presence of metals and also requires manipulating the controller in free space. The 2D/6D Mouse of Logitech Inc. is similar in function, but uses acoustic ranging similar to the Mattel device. The 3SPACE sensor from Polhemus, described in U.S. Pat. No. 4,017,858, issued to Jack Kuipers Apr. 12, 1977, uses electromagnetic coupling between three transmitter antennas and three receiver antennas. Three transmitter antenna coils are orthogonally arranged as are three receiver antennas, and the nine transmitter/receiver combinations provide three dimensional position and orientation information. However, all "flying mouse" devices require the undesirable and tiring movement of the users entire arm to manipulate the controller in free space. Further, these devices are either tethered by a cord or sensitive to either electromagnetic or acoustic noise.

A device similar to the flying mice is taught in U.S. Pat. No. 4,839,838. This device is a 6D controller using 6 independent accelerometers in an "inertial mouse." However, the device must still be moved in space, and the use of accelerometers rather than ranging devices limits the accuracy. Another inertial mouse system is taught in U.S. Pat. No. 4,787,051 issued to Lynn T. Olson.

A third category of 3D/6D controllers includes 3D/6D joysticks and trackballs. Spaceball of Spatial Systems, Inc. is a rigid sphere containing strain gauges or optical sensors to measure the forces and torques applied to a motionless ball. The user pushes, pulls or twists the ball to generate 3D translation and orientation control signals. Spaceball is described in detail in U.S. Pat. No. 4,811,608 issued to John A. Hilton Mar. 14, 1989. Similarly, the DIMENSION 6/Geoball controller distributed by CiS Graphics Inc. incorporates a 6-axis optical torque sensor housed in a spherical enclosure. The device measures translational forces and rotational torques. However, these devices are subject to a number of disadvantages. For example, it is difficult to provide for precise positioning, as there is no provision for the use of a stylus. Further, these devices are primarily controlled with hand muscles, rather than with the more precise finger muscles. Further still, these devices provide for only relative control and have no provision for providing an absolute origins or an absolute positions. They are therefor not suitable for providing closure in digitized 3D inputs. Finally, they are limited in there ability to provide an intuitive feel for 3D manipulation of a controlled object not specified in the Cartesian coordinate system. For example, they are not readily adaptable to spherical or cylindrical coordinate systems.

2. (b) Prior Art Force-Sensitive Transducers.

Force-sensitive transducers are characterized in that they do not require a significant amount of motion in order to provide a control input. These devices have appeared in a number of configurations, some of which are capable of sensing not only the presence or non-presence of the touch of a user's finger or stylus, but also the ability to quantitatively measure the amount of force applied. One such a device is available from Tekscan, Inc. of Boston, Mass. This device includes several force-sensitive pads in a grid-based matrix that can detect the force and position of multiple fingers at one time. Another force-sensitive device is available from Intelligent Computer Music Systems, Inc. of Albany, N.Y. under the TouchSurface trademark. The Touch-Surface device can continuously follow the movement and pressure of a fingertip or stylus on its surface by responding to the position (X and Y) at which the surface is touched and to the force (Z) with which it is touched. Further, if two positions are touched simultaneously in the TouchSurface device, an average position of the two positions is provided. However, these devices are currently limited in manipulating objects beyond 2.5 dimensions, i.e. X-position, Y-position, and positive Z-direction, and are not available in any intuitive controllers.

Force-sensitive transducers have been used in two-dimensional applications in place of spring-loaded joysticks.

For example, U.S. Pat. No. 4,719,538 issued to John D. Cox teaches using force-responsive capacitive-transducers in a joystick-type device. However, these devices do not typically provide for 3D/6D inputs. An augmented 2D controller using force-sensitive devices is taught in U.S. Pat. No. 4,896,543 issued to Larry S. Gullman. Gullman describes a three-axis force measurement stylus used as a computer input device wherein the forces sensed by the stylus are used for recognizing ciphers, selecting colors, or establishing line widths and line densities. However, this device does not provide inputs for roll, yaw or pitch, and does not provide any input for a negative Z input (i.e. there is no input once the stylus is lifted). Thus, it is limited in its ability to provide 3D positioning information, as this would require an undesirable bias of some sort.

2. (c) Prior Art 3D/6D Field Controllers.

3D/6D controllers are found in many field applications, such as controllers for heavy equipment. These devices must be rugged, accurate and immune from the affects of noise. Accordingly, many input control devices used for interactive computer graphics are not suitable for use in field applications. As a result, heavy equipment controllers typically consist of a baffling array of heavy-but-reliable levers which have little if any intuitive relationship to the function being performed. For example, a typical heavy crane includes separate lever controls for boom rotation (swing), boom telescope (extension), boom lift and hook hoist. This poor user interface requires the operator to select and select and pull one of a number of levers corresponding to the boom rotation control to cause the boom to rotate to the left. Such non-intuitive controls makes training difficult and accidents more likely.

Accordingly, it is desirable to provide a 3D/6D controller that is easy to use, inexpensive, accurate, intuitive, not sensitive to electromagnetic or acoustic interference, and flexible in its ability to manipulate objects. Specifically, a substantial need exists for a graphical input device capable of providing for the precision manipulation of position and spatial orientation of an object, and that also provides for precise positioning and orientation by the use of a stylus or pen. It is desirable that the device accepts intuitive and simple input actions such as finger motion to manipulate position and orientation. It is desirable that it does not require manipulation of a controller in free space or otherwise cause fatigue. It is desirable that the device provides the dual-functionality of both absolute and relative inputs, that is, inputs similar to a data tablet or touch panel that provide for absolute origins and positions, and inputs similar to mice and trackballs that report changes from former positions and orientations. It is desirable that the device recognizes multiple points for positioning and spatial orientation and allows the use of multiple finger touch to point or move a controlled object in a precise manner. Further, it is desirable to have a controller which exhibits a zero neutral force, that is, one that does not require a force on the controller to maintain a neutral position.

SUMMARY OF THE INVENTION

A family of controllers incorporate multiple force/touch sensitive input elements and provide intuitive input in up to six degrees-of-freedom, including position and rotation, in either a Cartesian, cylindrical or spherical coordinate system. Six dimensions of input can be generated without requiring movement of the controller, which provides a controller suitable for controlling both cursors or display objects in an interactive computer system and for controlling equipment such as heavy cranes and fork lift trucks. In various embodiments positional information is obtained by either a "pushing" or "dragging" metaphor. Rotational information is provided by either a "pushing," "twisting," or "gesture" metaphor. In certain embodiments, the same sensor is used for both positional and rotational inputs, and the two are differentiated by the magnitude of the force applied to the sensor.

These and other advantages and features of the invention will become readily apparent to those skilled in the art after reading the following detailed description of the preferred embodiment of the present invention and studying the accompanying drawings.

BRIEF DESCRIPTION OF THE DRAWINGS

FIG. 9b is an illustration of sensing yaw with reference to the controller of FIG. 9a.

FIG. 9c is an illustration of sensing roll with reference to the controller of FIG. 9a.

FIG. 9d is an illustration of sensing pitch with reference to the controller of FIG. 9a.

FIG. 16 illustrates a wedge controller adapted for use in controlling a mobile crane.

FIG. 17 illustrates a mobile crane.

FIG. 18 illustrates a controller for use in a spherical coordinate system.

DETAILED DESCRIPTION OF THE PREFERRED EMBODIMENT

Figure 1:
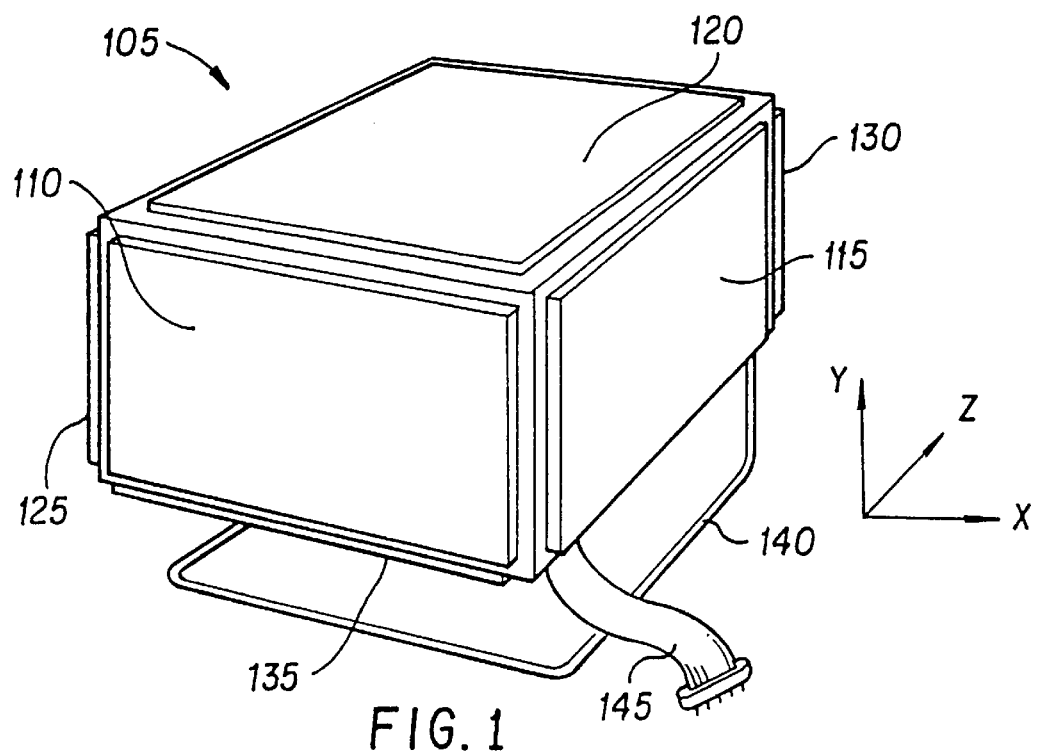
FIG. 1 is an illustration of a 3D controller having six force/touch sensitive sensors.

FIG. 1 is an illustration of a force/touch sensitive 3D controller in accordance with the first preferred embodiment of the present invention. A controller 105 is shaped in the form of a cube. A first force-sensitive pad 110 is positioned on the front of controller 105. A second force-sensitive pad 115 is positioned on the right side of controller 105. A third force-sensitive pad 120 is positioned on the top side of controller 105. A fourth force-sensitive pad 125 is positioned on the left side of controller 105. A fifth force-sensitive pad 130 is positioned on the back side of controller 105. A sixth force-sensitive pad 135 is positioned on the bottom side of controller 105. A frame 140 is attached to the edge of controller 105 between the bottom and back surfaces, allowing access to all six surfaces of controller 105. Control harness 145 is coupled to the six force-sensitive pads 110, 115, 120, 125, 130, and 135 and provides signals in response to the application of pressure to the pads.

Controller 105 is operated by pressing on any of the six force-sensitive pads. The user interface is intuitive since the real or displayed object will move as if it is responding to the pressure on controller 105. For example, pressing down on force-sensitive pad 120, positioned on the top of controller 105, will cause the object to move downward (−Y). Similarly, pressing up on force-sensitive pad 135, positioned on the bottom of controller 105, will cause the object to move upward (+Y). Pressing the controller towards the user, by pressing on force-sensitive pad 130, positioned on the back of controller 105, will cause the object to move towards the user (−Z). Pressing the controller away from the user, by pressing on force-sensitive pad 110, positioned on the front of controller 105, will cause the object to move away the operator (+Z). Pressing the controller to the left, by pressing on force-sensitive pad 115, positioned on the right side of controller 105, will cause the object to move to the left (−X). Similarly, pressing the controller to the right, by pressing on force-sensitive pad 125, positioned on the left side of controller 105, will cause the object to move to the right (+X).

Figure 2:
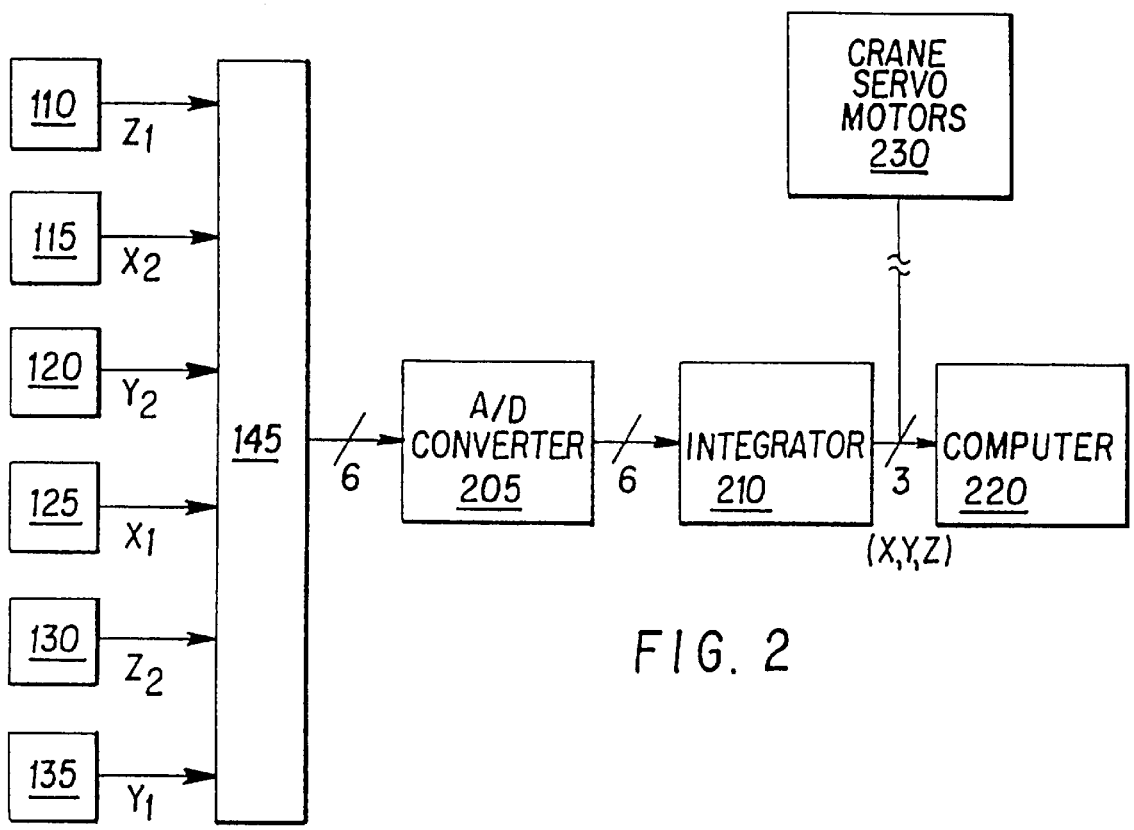
FIG. 2 is a block diagram of the control electronics of the 3D controller of FIG. 1.

A block diagram of the controller electronics used to provide 3D position information in conjunction with the controller of FIG. 1 is illustrated in FIG. 2. Force sensitive pads 110, 115, 120, 125, 130, and 135 are coupled to control harness 145, which couples all six force-sensitive pads to A/D converter 205. A/D converter 205 converts the analog signals from each of the force-sensitive pads into digital signals. The six digitized signals are coupled to integrator 210. Integrator 210 integrates the difference of the signals from the left and right force-sensitive pads 125 and 115 to provide an X position signal ($X=\int(X_{125}-X_{115})dt$); integrates the difference of the signals from the top and bottom force-sensitive pads 120 and 135 to provide a Y position signal ($Y=\int(Y_{135}-Y_{120})dt$); and integrates the difference of the signals from the front and back force-sensitive pads 110 and 130 to provide a Z position signal ($Z=\int(Z_{110}-Z_{130})dt$). The three position signals X, Y and Z are then coupled to a computer 220 to control the position of a cursor or display object, or alternatively to servo controls for heavy equipment, such as crane servo motors 230.

In the preferred first embodiment controller 105 is sensitive to the presence of a touch input and A/D converter 205 provides a binary signal output to integrator 210 for each force-sensitive pad. This provides a controller that provides a single "speed," that is, activation of a force-sensitive pad will result in the cursor, object or equipment moving in the desired direction at a certain speed. Alternatively, force-sensitive pads 110, 115, 120, 125, 130 and 135 can be of the type that provide analog outputs responsive to the magnitude of the applied force, A/D converter 205 can be of the type that provides a multi-bit digital signal, and integrator 210 can be of the type that integrates multi-bit values. The use of a multi-bit signals allows for multiple "speeds," that is, the speed of the cursor or object movement in a given direction will be responsive to the magnitude of the force applied to the corresponding force-sensitive pads.

Figure 3:
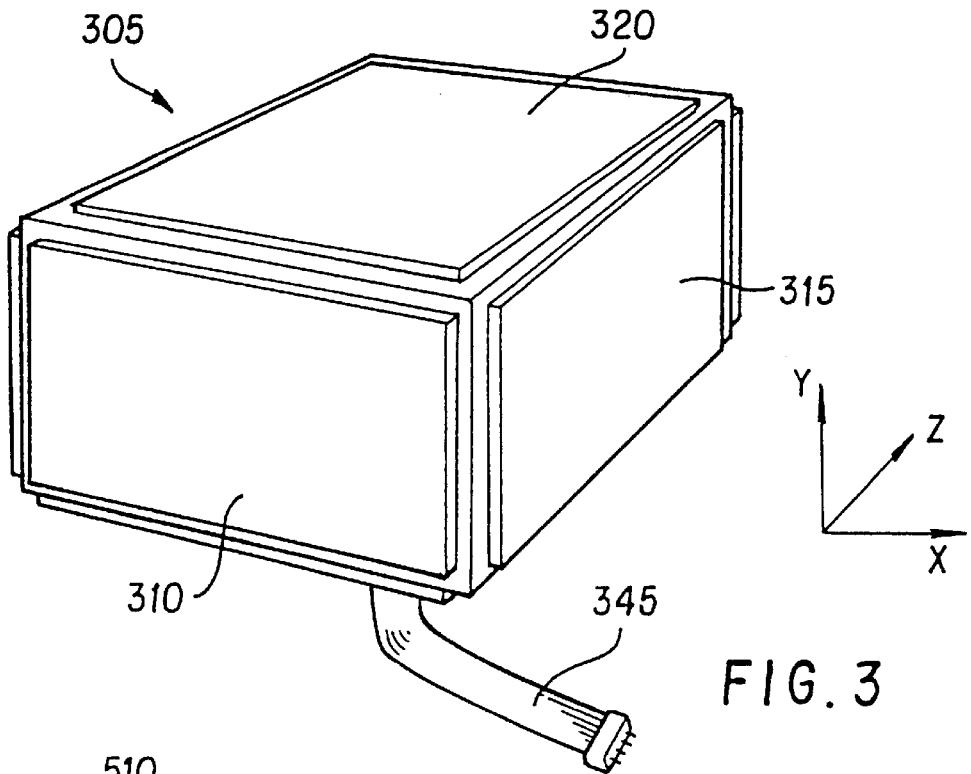
FIG. 3 is an illustration of a 6D controller having three X-Y-position and force/touch sensitive sensors.
Figure 4A:
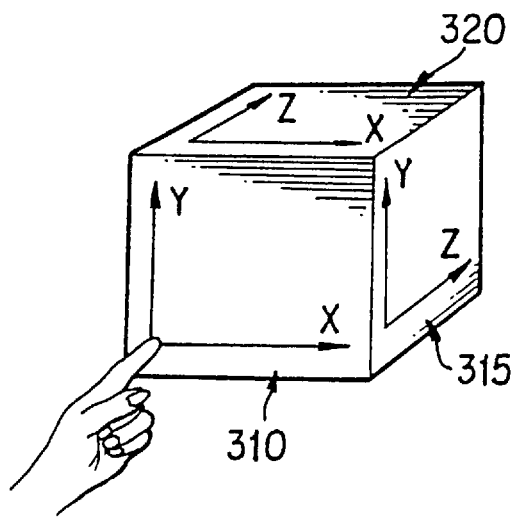
FIG. 4a illustrates the user interface of the controller of FIG. 3 with regards to positional information.

FIG. 3 is an illustration of a force/touch sensitive 6D controller in accordance with the second preferred embodiment of the present invention. Controller 305 is also shaped in the form of a cube, however this controller uses three force-sensitive matrix sensors. A first force-sensitive matrix sensor 310 is positioned on the front of controller 305. Sensor 310 provides two analog signals in response to the position of an applied force, which provides X and Y position information as illustrated in FIG. 4a. Sensor 310 also provides a third signal in response to the magnitude of the force applied to sensor 310. A second force-sensitive matrix sensor 315 is positioned on the right side of controller 305. Sensor 315 provides two analog signals in response to the position of the force applied to sensor 315, which will be interpreted by control electronics to provide Y and Z information as illustrated in FIG. 4a. Sensor 315 also provides a third signal responsive to the magnitude of the force applied to sensor 315. A third force-sensitive matrix sensor 320 is positioned on the top side of controller 305. Sensor 320 provides two analog signals in response to the position of the force applied to sensor 320, which will be interpreted by the control electronics to provide Z and X information as illustrated in FIG. 4a.

In operation, sensors 310, 315 and 320 provide redundant X, Y and Z positional control of a cursor, object or equipment. That is, Y-position information can be entered on either sensor 310 or 315, X-position information can be entered on either sensor 310 or 320, and Z-position information can be entered on either sensor 315 or 320. The two X inputs are summed to provide the final X position information. Y and Z information is obtained in the same manner. Thus a change in position on a sensor is interpreted as a change of position of the real or display object, with a fixed or programmable gain.

Figure 4B:
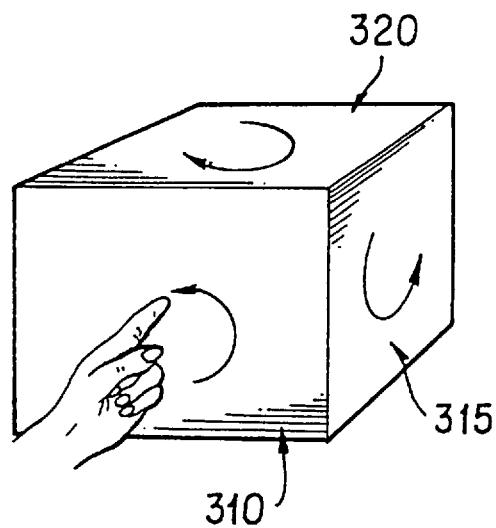
FIG. 4b illustrates the user interface of the controller of FIG. 3 with regards to rotational information.

For applications requiring six degrees-of-freedom input, such as manipulating the orientation of an object or equipment, sensors 310, 315 and 320 also provide the pitch, yaw and roll control. Specifically, the third signal provided by each sensor is used to differentiate "light" from "strong" pressures on each sensors. Threshold detector 535, illustrated in FIG. 5, receives the third signal from each sensor and couples the related two analog signals to either positional interpreter 540 or to orientation interpreter 545 in response to the third signal being "light" or "strong" respectively. Specifically, when a pressure exceeding a pre-defined threshold is detected, the two analog signals from the affected sensor are used to provide orientation information. Referring to FIG. 4b, when a strong pressure is detected on sensor 310, the two analog signals from sensor 310 are used to provide pitch information about the Z-axis. Similarly, when a strong pressure is detected on sensor 315, the two analog signals from sensor 315 are used to provide roll information about the X-axis. Finally, when a strong pressure is detected on sensor 320, the two analog signals from sensor 320 are used to provide pitch information about the Y-axis.

Figure 5:
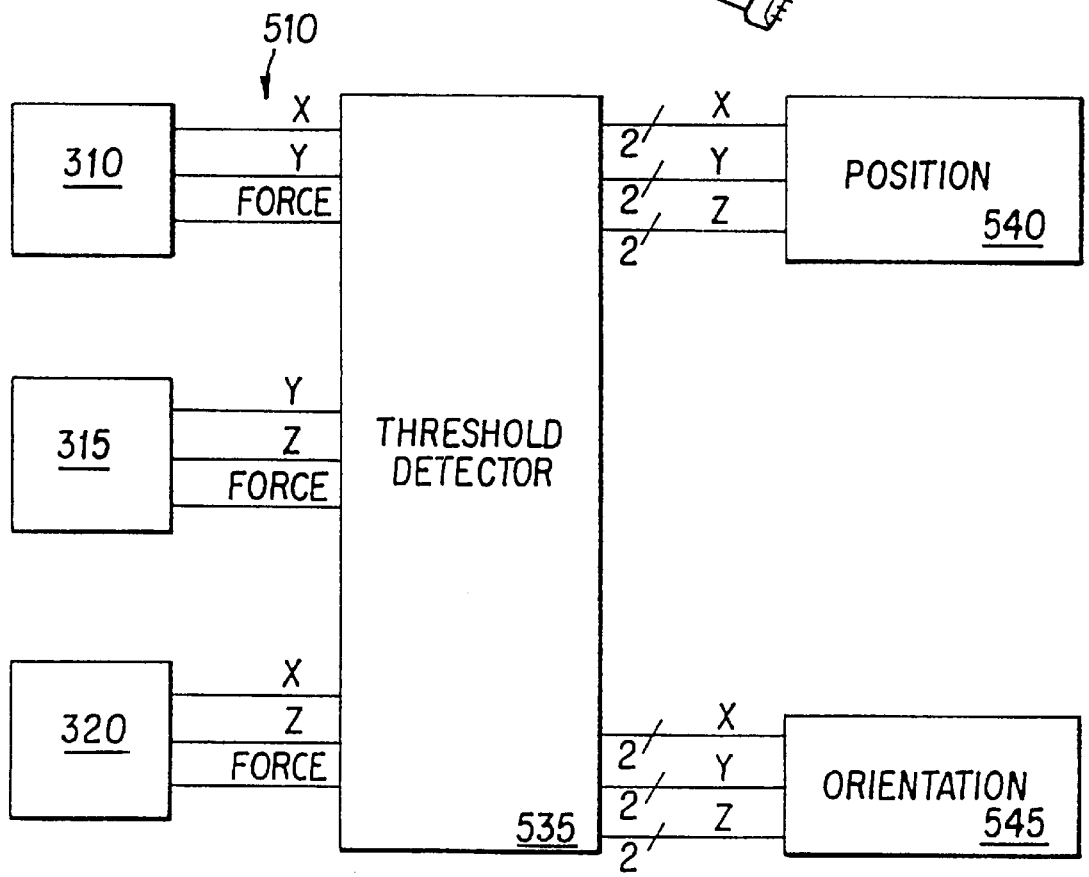
FIG. 5 is a block diagram of the control electronics of the 6D controller of FIG. 3.

FIG. 5 is a block diagram of the control electronics of the 6D controller of FIG. 3. Force-sensitive matrix sensors 310, 315, and 320 are coupled to control harness 510, which couples all three force-sensitive matrix sensors to threshold detector 535. A threshold detector 535 directs sensor information to either position interpreter 540 or orientation interpreter 545 in response to the magnitude of the force signal. Position interpreter 540 can operate in either of two modes. In an absolute mode, the position of the X-signal is directly translated to the X-position of the cursor or object. If two inputs are present the inputs can be either averaged or the second ignored. In a relative mode, positional interpreter 540 responds only to changes in X-values. Again, if two inputs are present they can either be averaged or the second input ignored. The Y and Z information is obtained in a similar manner.

Orientation interpreter 545 interprets rotational gestures as rotational control signals. More specifically, when a user applies pressure above the threshold pressure as detected by threshold detector 535, the analog information from the affected sensor is coupled to orientation interpreter 545 and interpreted as an orientation or rotation about the axis perpendicular to that sensor. The angular position of the pressure point is calculated with reference to the center point of the sensor. In a relative operating mode any angular changes are interpreted as rotations. The rotation can be modified by a programmable gain if desired. Orientation interpreter can also operate in an absolute mode. In an absolute mode, the orientation is determined from the two signals from each sensor by determining the angular position of the input relative to the center point of the sensor.

Figure 6:
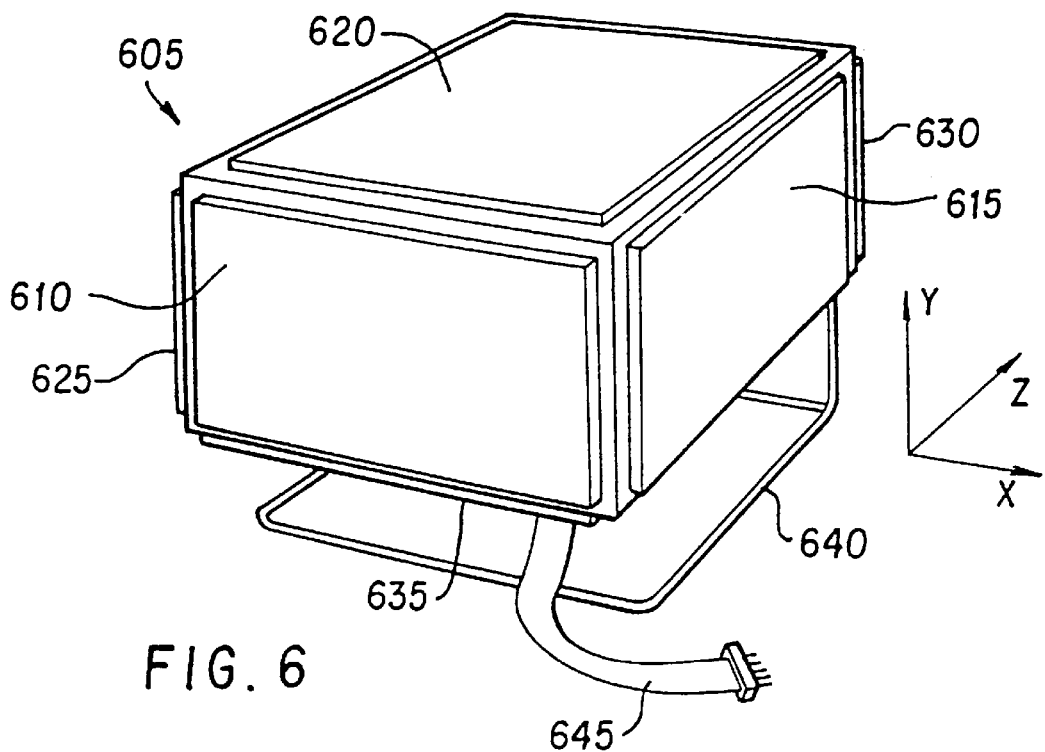
FIG. 6 illustrates a 6D controller having six X-Y-position and force/touch sensitive sensors.

FIG. 6 illustrates a third preferred embodiment of a 6D controller 605. Controller 605 is shaped in the form of a cube. A first force-sensitive matrix sensor 610 is positioned on the front of controller 605. A second force-sensitive matrix sensor 615 is positioned on the right side of controller 605. A third force-sensitive matrix sensor 620 is positioned on the top side of controller 605. A fourth force-sensitive matrix sensor 625 is positioned on the left side of controller 605. A fifth force-sensitive matrix sensor 630 is positioned on the back side of controller 605. A sixth force-sensitive matrix sensor 635 is positioned on the bottom side of controller 605. A frame 640 is attached to the edge of controller 605 between the bottom and back surfaces, allowing access to all six surfaces of controller 605. Control harness 645 is coupled to force-sensitive matrix sensor 610, 615, 620, 625, 630, and 635 and provides signals indicative of the magnitude and the position of the force applied to each sensor.

The X, Y and Z position data and the orientation data is derived in the same way as described with reference to controller 305 illustrated in FIGS. 3, 4a and 4b. The additional sensors provide multiple redundant entry capabilities. Specifically, yaw information about the Z-axis can be provided by either sensor 610 or sensor 630. Roll information about the X-axis can be provided by either sensor 615 or sensor 625. Pitch information about the Y-axis can be provided by either sensor 620 or sensor 635. Similarly, X-position information can be provided by sensors 610, 620, 630 and 635. Y-position data can be provided by sensors 610, 615, 630 and 625. Z-position data can be provided by sensors 620, 615, 635, 625. As before, multiple inputs can be resolved either by averages or by ignoring secondary inputs. More specifically, priority can be given to specific sensors or priority can be given with regards to the relative time of the inputs. Further, inputs can be interpreted on either absolute or relative modes.

Figure 7:
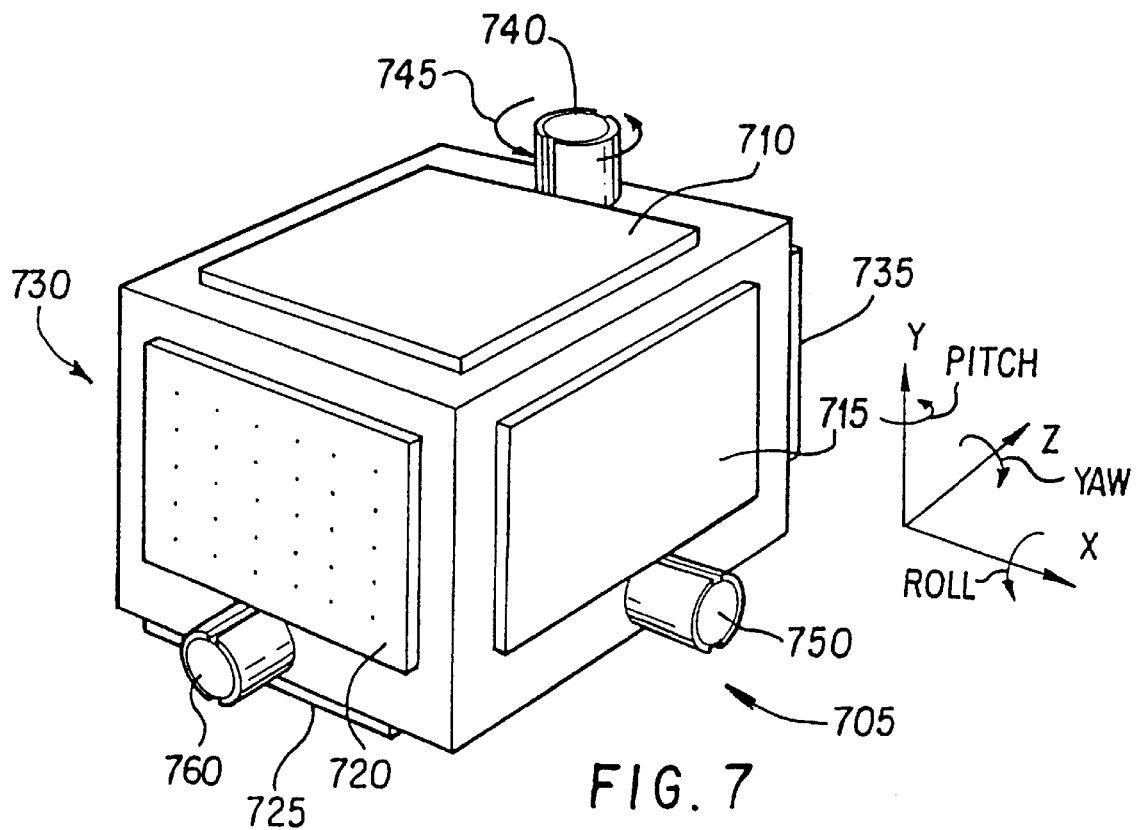
FIG. 7 illustrates a 6D controller having six X-Y-position and force/touch sensitive sensors and three knobs.

A fourth preferred embodiment of a 6D controller 705 is illustrated in FIG. 7. A controller 705 is shaped in the form of a cube with three attached knobs. Six force-sensitive matrix sensors 710, 715, 720, 725, 730 and 735 are positioned on controller 705 in the same manner as explained in detail with regards to controller 605 illustrated in FIG. 6. However, these force-sensitive matrix sensors are used only to generate position commands in the X, Y, and Z directions.

Knobs 740, 750 and 760 provide the orientation information for roll, yaw and pitch. Specifically, knob 740 provides pitch information about the Y-axis, knob 750 provides roll information about the X-axis, and knob 760 provides yaw information about the Z-axis.

As illustrated with regards to knob 740, each knob includes at least one sensor pad that can detect one dimensional information about the circumference of the knob. Preferably, each sensor can average two inputs. Movement of one or two pressure points on a sensor is interpreted as rotation about the axis of that sensor. Thus each knob generates orientation information about one axis in response to twisting of a thumb and finger about that knob. Specifically, sensor 745 on knob 740 provides one-dimensional position information about the circumference of knob 740. In the case of two inputs applied to a sensor, the average position of the two inputs is interpreted in a relative mode, and a programmable gain is provided. More specifically, the rotational command (the change in rotation) is calculated as follows:

theta=G*360°*dl/L

Where theta is the rotational command;

G is the programmable gain;

dl is the change in the average position of the fingers; and

L is the circumference of the knob.

For example, twisting the thumb and finger one centimeter on knob 740 is interpreted as 90° of rotation about the Y-axis. Alternatively, the gain can be increased or decreased as desired.

Figure 8:
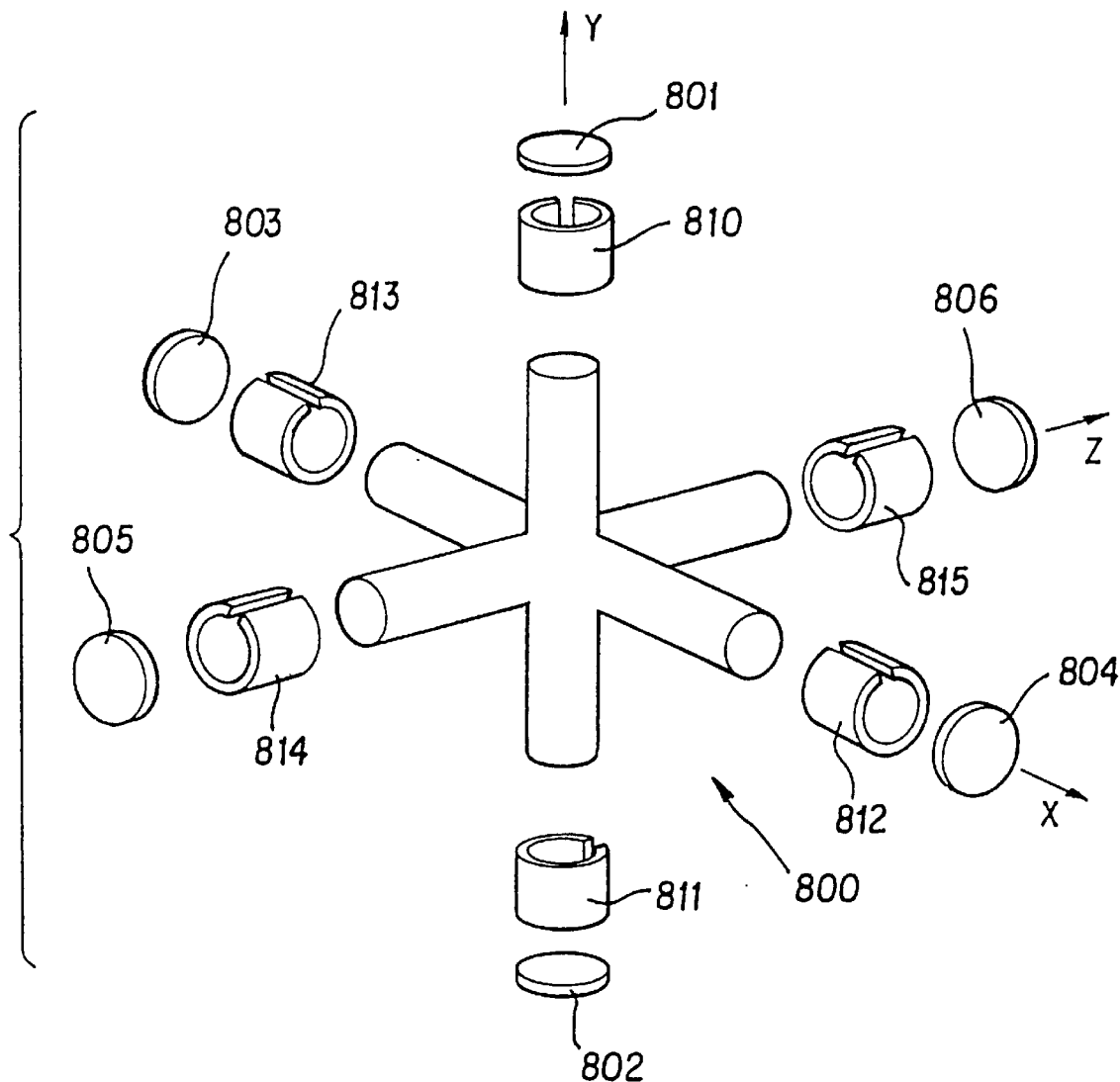
FIG. 8 is an expanded view of a "twist-mode" touch cylinder controller.

FIG. 8 is an expanded view of a touch cylinder 800 in accordance with another embodiment of the present invention. Touch cylinder 800 provides X, Y, and Z positional information in response to forces applied to force-sensitive sensors 801, 802, 803, 804, 805, 806 positioned on the ends of six interconnected cylinders comprising touch cylinder 800. These six sensors are coupled and operate in the same manner as the six force-sensitive pad of controller 105 described with reference to FIG. 1. Touch cylinder 800 provides orientation information in response to signals from sensors 810, 811, 812, 813, 814 and 815. These sensors operate in the same manner as three knobs 740, 750 and 760 of controller 705 described with reference to FIG. 7, with the multiple inputs for each axis summed.

Another embodiment of a touch cylinder 900 is illustrated in FIGS. 9a–9d. Again, touch cylinder 900 is constructed of six cylinders, each aligned along a Cartesian coordinate, and connected together at the origin of the Cartesian coordinate system. Each cylinder has force-sensitive sensors on its end for positional information as in touch cylinder 800. However, touch cylinder 900 derives rotational information in a different manner. Specifically, the circumference of each cylinder is covered with a force-sensitive sensor that is divided into at least four sections. For example, the cylinder aligned in the +X direction includes sections 901, 902, 903, and 904. Each section covers 90° along the circumference of the cylinder. Similarly, the other five cylinders are also covered by force-sensitive sensors each with four sections. As illustrated, the centers of each of the sections lie on a plane of the Cartesian coordinate system defined by the six cylinders.

Figure 9A:
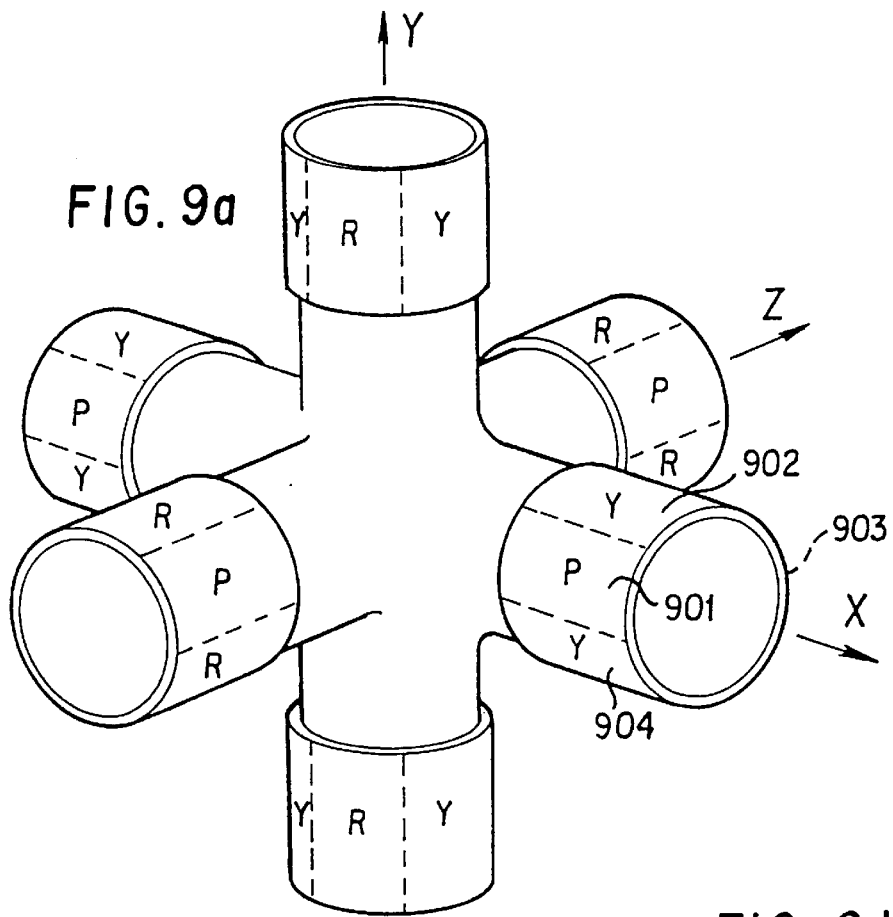
FIG. 9a is an illustration of a "push-mode" touch cylinder controller.
Figures 9B, 9C, 9D:
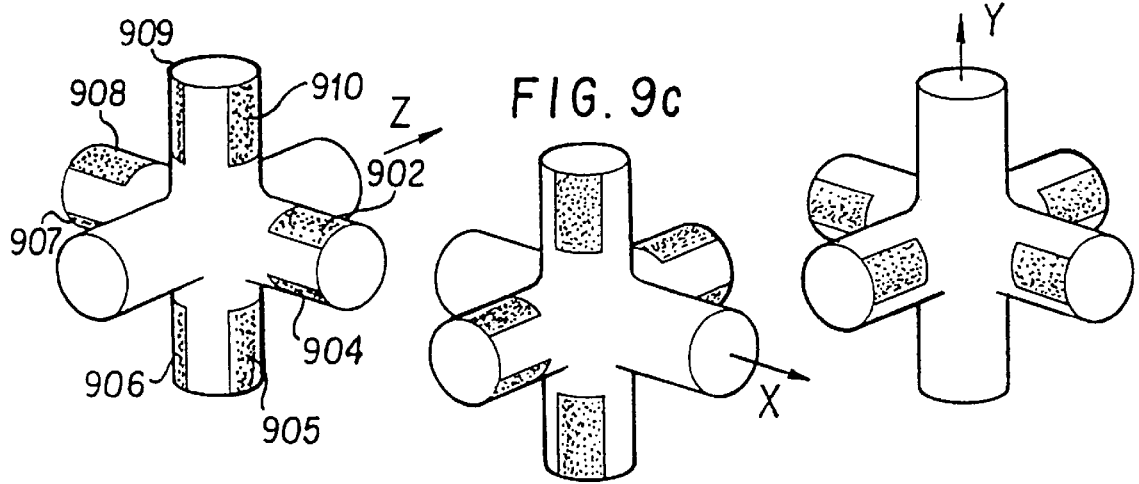

Operation of touch cylinder 900 is described with reference to a "push" mode. Specifically, rotational information is provided by "pushing" sensors positioned on the sides of the cylinders to rotate the object about one of the axes other than the one on the cylinder of the enabled sensor as if it had been "pushed" in the same direction as the controller. This is more easily explained by illustration. Referring to FIG. 9b, a rotational yaw input about the Z-axis is provided by pressing any of sensors 902, 904, 905, 906, 907, 908, 909 or 910. Sensors 904, 906, 908, and 910 provide a positive (counterclockwise) yaw signal, sensors 902, 905, 907 and 909 provide negative (clockwise) yaw signals. These signals can be combined as described above, and the signals can be either "on/off" or have multiple levels. Roll and pitch information is provided in a similar manner, as illustrated in simplified diagrams 9c and 9d.

Figure 10A:
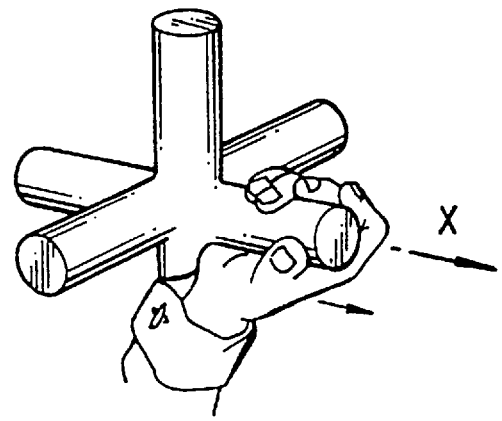
FIGS. 10a, 10b, and 10c are illustrations of sensing X-position, Y-position and Z-position respectively in a "drag-mode."
Figure 10B:
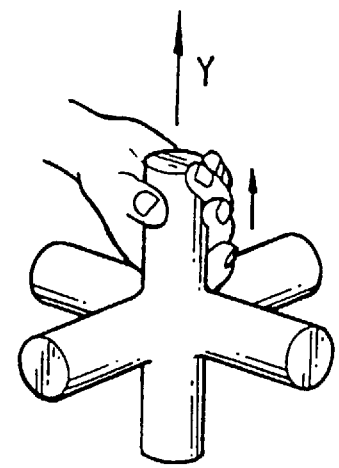
Figure 10C:
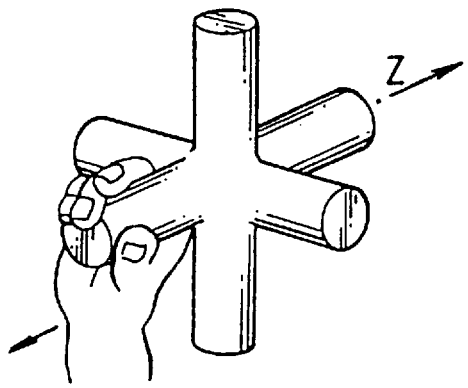

A third embodiment of a touch cylinder 1000 is illustrated in FIGS. 10a–10c. Unlike touch cylinders 800 and 900, touch cylinder 1000 has no sensors on the ends of the six cylinders. Six sensors on the cylinders provide orientation information in the same manner as the sensors 810–815 in touch cylinder 800. However, the sensor pads of touch cylinder 1000 are two-dimensional and provide information responsive to the position of pressure along the cylinders as well as in response to the position of the pressure around the circumference of each cylinder. As illustrated in FIG. 10a, movement of the thumb and forefinger along the X-axis cylinder in the X-direction is detected by sensor 1040. The X-position information from the two inputs (thumb and forefinger) is averaged and used to provide a relative positional input to the cursor or controlled object. Y-position information is provided in a similar manner as illustrated in FIG. 10b. Z-position information is provided as illustrated in FIG. 10c.

Figure 11:
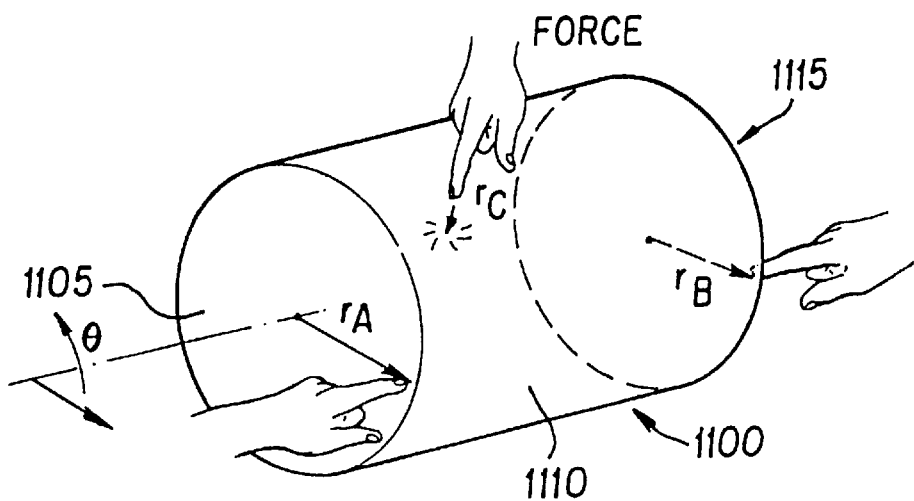
FIG. 11 illustrates a pipe-crawler controller.
Figure 12:
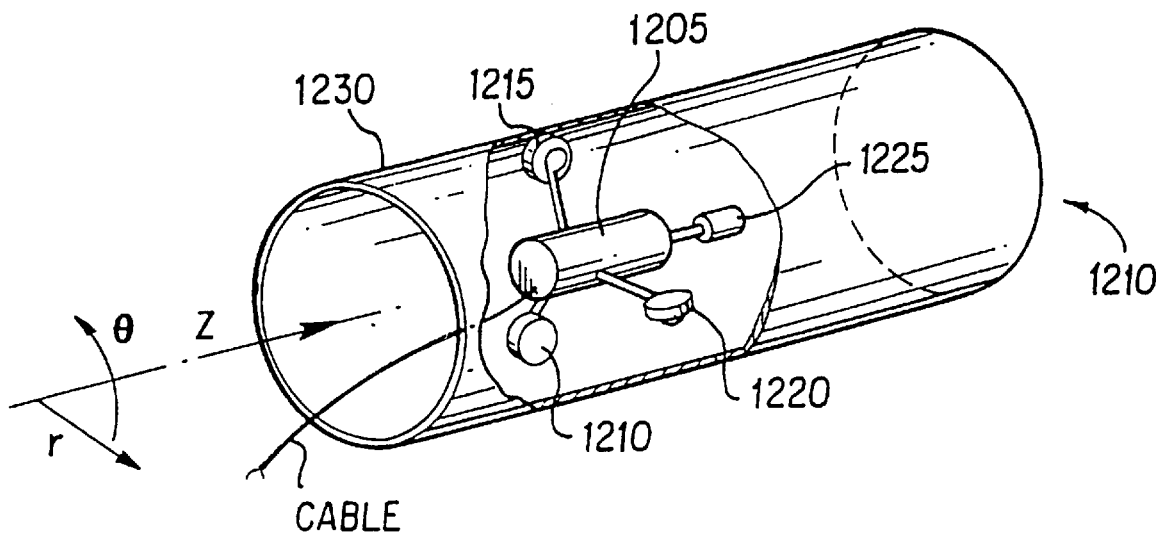
FIG. 12 illustrates a pipe-crawler robot.

FIG. 11 illustrates a pipe-crawler controller 1100 in accordance with the present invention designed for applications in a cylindrical coordinate system. One example of such a use is for controlling a pipe-crawling robot within a pipe in an industrial plant. Such a pipe-crawling robot is illustrated in FIG. 12, where a robot 1205 is supported by three legs 1210, 1215, and 1220 carries a camera or ultrasound detector 1225 for inspecting interior surfaces of a pipe 1230. Pipe-crawler controller 1100 consists of three force-sensitive sensors 1105, 1110, and 1115, each of which can detect position information is two dimensions and force. Z-position data along the cylinder is provided in response to the position of pressure along the Z-axis on sensor 1110. Theta information can be obtained from the theta position information from sensor 1110. Radial (r) information is provided by the r position of pressure applied to sensors 1105 and 1115.

Alternatively, Z-position can be responsive to the force of signals applied to sensors 1105 and 1115 in a manner similar to controller 105. Theta information can be obtained in a manner similar to that used for rotation information in controller 305. Radial information can be obtained from the force of the pressure applied to sensor 1110.

Figure 13:
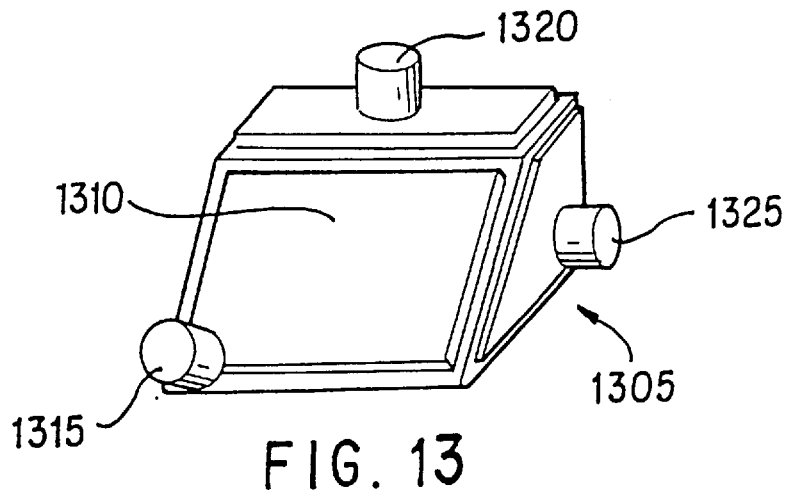
FIG. 13 illustrates a shape variation of controller 705 adapted for easy uses of a stylus.

FIG. 13 illustrates a controller 1305 having a sloped front surface adapted to be more compatible with the use of a stylus. Specifically, controller 1305 includes a inclined front sensor 1310. Position information is obtained in a manner similar to that of controller 305. The control inputs are not adjusted for the slope of the sensor, and movement of a pressure point on sensor 1310 will be interpreted identically as movement on sensor 310 of controller 305. Rotation information is provided by knobs 1315, 1320 and 1325 in a manner similar to the operation of the knobs of controller 705.

Figure 14:
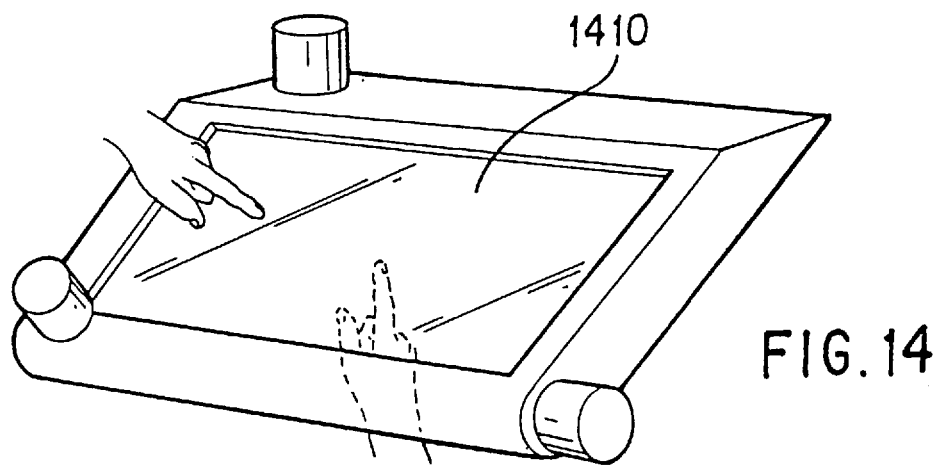
FIG. 14 illustrates a shape variation of controller 705 adapted for use with CAD/CAM digitizers.

FIG. 14 illustrates a shape variation of controller 705 with an expanded sensor 1410. This variation is adapted specifically for with in CAD/CAM digitizers.

Figure 15:
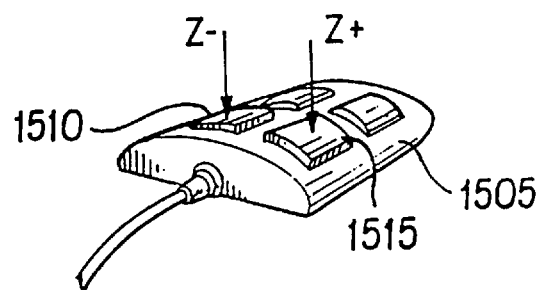
FIG. 15 illustrates the combination of two force-sensitive sensors on a mouse.

FIG. 15 illustrates the combination of two force-sensitive sensors on a mouse 1505. Mouse 1505 operates in a conventional manner to provide X-position and Y-position control signals. Force-sensitive sensor 1510 provides a signal for providing -Z information. Similarly, force-sensitive sensor 1515 provides a signal for providing +Z information.

FIG. 16 illustrates a wedge controller 1605 adapted for use in controlling a crane such as mobile crane 1705 illustrated in FIG. 17. Sensor pad 1610 provides information in the X and Y directions and a third signal in response to the force of the applied pressure. The third signal is used provide a signal to rotate the boom 1705 in a counterclockwise direction, as if pressure was applied to the right side of the boom, "pushing" it counterclockwise. X-position information from sensor 1610 controls the extension of boom end 1710. Y-position information from sensor 1610 controls the elevation of boom 1705 and boom end 1710. Sensor pad 1615 also provides information in the X and Y directions and a third signal in response to the force of the applied pressure. The third signal is used provide a signal to rotate boom 1705 in a clockwise direction, as if pressure was applied to the left side of the boom, "pushing" it clockwise. X-position information from sensor 1615 controls the movement of outrigger 1715 of the mobile crane. Y-position information from sensor 1615 controls hook cable 1720. For better understanding, the correspondence between control inputs ands the operation of mobile crane 1705 is also illustrated with reference to numerals 1–5, with the numerals on controller 1605 referring to the X, Y or force of one of the two sensors, and the corresponding numeral illustrating the corresponding motion controlled with reference to mobile crane 1705.

FIG. 18 illustrates a controller 1805 adapted for use in a spherical coordinate system. Controller 1805 is in the shape of a hemisphere with a hemispherical surface 1810 and a flat bottom surface 1815. Radial information is provided in response to activation of a force-sensitive pad on surface 1815. Theta and phi information is provided in response to positional information from a force-sensitive pad on surface 1810.

Figure 19:
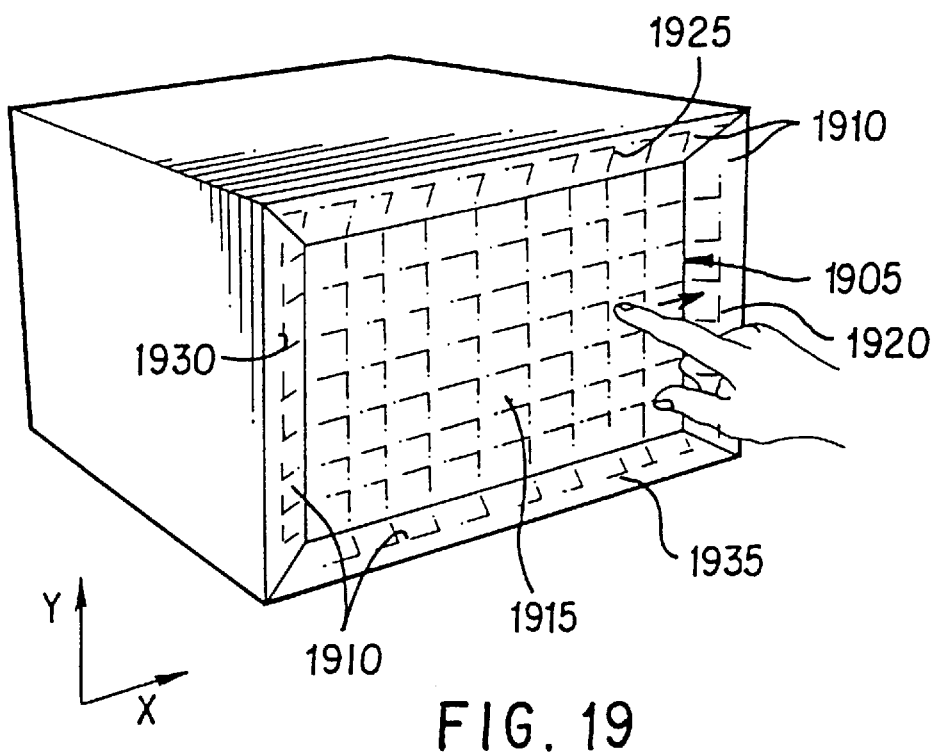
FIG. 19 illustrates a two-mode controller adapted for use in controlling an object or cursor in 2 dimensions.

FIG. 19 illustrates a controller adapted for use in controlling an object or cursor in 2 dimensions. A force-sensitive matrix sensor 1905 provides two signals, one X, and one Y, in response to the position of a force applied to the sensor. Further, sensor 1905 includes a raised area 1910 on its four edges which is tactilely distinguished from flat surface 1915 of sensor 1905 by the inclination of area 1910 relative to surface 1915. In the preferred embodiment, area 1910 includes an area at each of the four edges of surface 1915. The edges are inclined and raised relative to flat surface 1915. This provides an area of the sensor tactilely distinguished from flat surface 1915 which operates in a different mode. For example, in a relative mode for X and Y-position a change in position on sensor area 1915 is interpreted as a proportional change in cursor position. Once the operator's finger reaches raised area 1910 a steady force (without movement) on raised area 1910 is interpreted as a continuation of the cursor movement. Cursor movement can be continued at either the most recent velocity along an axis, or at a preset speed, as long as a force is detected on the portion of area 1910 on that axis, such as portion 1920 with regards to movement in the positive X-direction. Alternatively, the speed of the cursor movement along an axis could be proportional to the amount of force applied to area 1910 on that axis. Thus, area 1920 would provide control of +X cursor speed, area 1925 would provide control of +Y cursor speed, area 1930 would provide control of -X cursor speed, and -Y would provide control of -Y cursor speed. In any case, the operator is provided with the advantages of two alternative operating modes and the ability to combine the two modes in order to continue cursor movements in a desired direction even after reaching the edge of sensor area 1915.

The controllers described in FIGS. 1–10c, 13 and 14 are adapted for use in the Cartesian coordinate system. In general, they can be categorized by the modes used for position and rotation control. Specifically, a "push mode" for position control is used in the embodiments described with reference to FIGS. 1, 8, and 9a. In contrast, a "drag mode" for position is used in the embodiments described with reference to FIGS. 3, 6, 7, and 10a–c. With regards to rotation, three general modes are used. "Gesture" mode for rotation is used in the embodiments described with reference to FIGS. 3 and 6. "Push mode" or "torque mode" for rotation is used in the embodiments described with reference to FIGS. 9a–d. Finally a "twist mode" for rotation is used in the embodiments described with reference to FIGS. 7 and 8. These modes can be combined in a number of ways as taught by the various embodiments. Further, different modes can be adapted to the cylindrical and spherical controllers taught with reference to FIGS. 11, 12, 16 and 17.

Accordingly, while the invention has been particularly taught and described with reference to the preferred embodiments, those versed in the art will appreciate that minor modifications in form and details may be made without departing from the spirit and scope of the invention. For example, the embodiments variously describe the derivation of information from single or multi-bit sensor and A/D converter combinations. It should be well understood that these could be used interchangeably as would best fit the application. Further, while the sensors on the Cartesian controllers are generally aligned on and orthogonal relative to axes, as illustrated in FIGS. 1 and 3, these sensors can also be inclined as illustrated in FIG. 13, and still are considered to be generally aligned and orthogonal to the axes. Accordingly, all such modifications are embodied within the scope of this patent as properly come within my contribution to the art and are particularly pointed out by the following claims.

I claim:

1. A cylindrical controller for providing control signals in a cylindrical coordinate system having Z coordinates, angle coordinates, and radial coordinates, the controller being shaped substantially as a cylinder having a circumference positioned between two ends, the controller comprising a plurality of force sensitive sensors, wherein a first sensor is mounted about at least a portion of the circumference of the cylinder and a second sensor is mounted on one of the ends of the cylinder, the sensors providing radial information in response to the radial position of a first force applied to the end of the cylinder, providing Z information in response to the Z position of a second force applied to the circumference of the cylinder, and for providing angle information in response to the angular position of the second force about the circumference of the cylinder.

2. A controller for providing control signals in a spherical coordinate system having a radial dimension, a theta dimension, and a phi dimension, the controller being shaped substantially as a hemisphere having a hemispherical surface and an end, the controller comprising;

a first force sensitive sensor mounted about the surface of the hemisphere, the first sensor providing theta dimension control information and phi dimension control information in response to a position of a force applied to the surface of the hemisphere; and a second force sensitive sensor mounted on the end of the hemisphere and providing radial dimension control information in response to the radial position of a force applied to the end of the hemisphere.

3. A cylindrical controller for providing control signals in a cylindrical coordinate system having Z, θ, and r dimensions, the controller being shaped substantially as a cylinder having central axis and a circumference provided about the central axis and positioned between a first end and a second end of the cylinder, wherein the Z dimension linearly extends along the central axis, the θ dimension is rotationally provided about the central axis, and the r dimension radially extends perpendicular to the central axis, the controller comprising:

a first force sensitive sensor mounted on at least a portion of the circumference of the cylinder, the first sensor providing Z control information in response to the position in the Z dimension of a force applied to the circumference of the cylinder, and providing angular control information in response to the position in the θ dimension of the force applied to the circumference of the cylinder; and a second force sensitive sensor mounted on the first end of the cylinder, the second sensor providing radial control signals in response to the position in the r dimension of a force applied to the first end of the cylinder.

4. A cylindrical controller as recited in claim 3 further comprising a third force sensitive sensor mounted on the second end of the cylinder, the third sensor providing radial control signals in response to the position in the r dimension of a force applied to the second end of the cylinder.

5. A cylindrical controller for providing control signals in a cylindrical coordinate system having Z, θ, and r dimensions, the controller being shaped substantially as a cylinder having a central axis and a circumference provided about the central axis and positioned between two ends of the cylinder, wherein the Z dimension linearly extends along the central axis, the θ dimension is rotationally provided about the central axis, and the r dimension radially extends perpendicular to the central axis, the controller comprising:

a first force sensitive sensor mounted about at least a portion of the circumference of the cylinder, the first sensor providing radial control information in response to an amount of pressure on said first force sensor applied in the r dimension; and a second force sensitive sensor mounted on one of the ends of the cylinder, the second sensor providing:

Z control information in response to a force under a predetermined threshold applied to the second sensor on the end of the cylinder in the Z dimension, and angular control information in response to a force over the predetermined threshold applied to the second sensor on the end of the cylinder in the θ dimension.

6. A cylindrical controller as recited in claim 5 further comprising a third force sensitive sensor mounted on the other one of the ends of the cylinder, the third sensor providing:

Z control information in response to a force under a predetermined threshold applied to the third sensor on the other end of the cylinder in the Z dimension, and angular control information in response to a force over the predetermined threshold applied to the third sensor on the other end of the cylinder in the θ dimension.

7. A cylindrical controller as recited in claim 6 wherein the difference of the Z control information from the second and third sensors is integrated to produce a Z position signal.

* * * * *